United States Patent [19]

Nicholson et al.

[11] Patent Number: 5,225,894
[45] Date of Patent: Jul. 6, 1993

[54] SPECTRAL DISCRIMINATION USING TEMPORAL MAPPING OF LIGHT PULSES THROUGH OPTICAL FILTERS

[75] Inventors: James E. Nicholson, Austin, Tex.; Jack H. Parker, Kettering, Ohio; Jagdish P. Mathur; David M. Hull, both of Austin, Tex.

[73] Assignee: Tracor Aerospace, Inc., Austin, Tex.

[21] Appl. No.: 802,552

[22] Filed: Dec. 5, 1991

[51] Int. Cl.$^5$ .............................................. G01J 3/51
[52] U.S. Cl. .................................. 356/419; 250/226; 250/227.12
[58] Field of Search ............... 356/218, 225, 226, 416, 356/419, 328; 250/227.12, 226

[56] References Cited

U.S. PATENT DOCUMENTS

| | | | |
|---|---|---|---|
| 4,164,373 | 8/1979 | Schuss et al. | 356/328 |
| 4,296,319 | 10/1981 | Franks et al. | |
| 4,299,488 | 11/1981 | Tomlinson, III | 356/328 |
| 4,309,108 | 1/1982 | Siebert | 356/352 |
| 4,671,604 | 6/1987 | Soref . | |
| 4,838,691 | 6/1989 | Master et al. | 356/319 |
| 4,971,439 | 11/1990 | Brown | 356/319 |
| 4,980,554 | 12/1990 | Ahn | 250/339 |
| 5,047,620 | 9/1991 | Durvasula et al. | 250/226 |

OTHER PUBLICATIONS

Jacobowitz, *IBM Technical Disclosure Bulletin*, vol. 18, No. 10, Mar. 1976 pp. 3384–3385.

*Primary Examiner*—F. L. Evans
*Attorney, Agent, or Firm*—Arnold, White & Durkee

[57] ABSTRACT

An incriment optical signal from a potential enemy threat is captured by an array of apertures which are connected to a number of broadband filters. The broadband filters have overlapping band pass regions to cover the wavelength spectrum of potential threats, but not with the spectral resolution of a larger number of narrowband filters. To further increase resolution without adding additional filters, each broadband filter is connected to an optical delay line which converts wavelength into a time delay. To enable measurement of the time delay, additional optical lines with no relative delay are connected directly from the apertures. The time difference between when a signal arrives over optical delay lines from the filters and when a signal arrives over optical lines directly from the array of apertures is then reconverted to wavelength to a high degree of resolution.

18 Claims, 1 Drawing Sheet

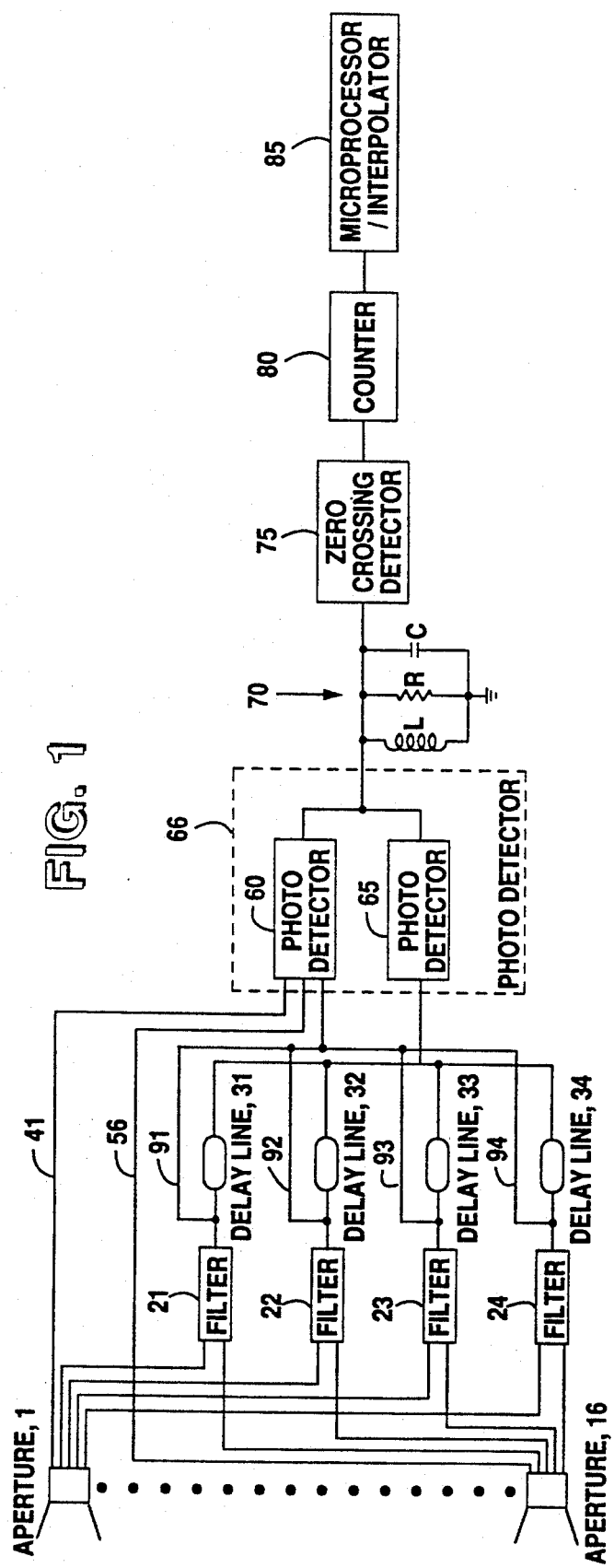

SPECTRAL DISCRIMINATION USING TEMPORAL MAPPING OF LIGHT PULSES THROUGH OPTICAL FILTERS

BACKGROUND OF THE INVENTION

1. Field of the Invention

The invention relates generally to a system of measuring the wavelength of an incoming signal, or spectral discrimination. More particularly, the invention relates to spectral discrimination of optical signals.

2. Description of the Prior Art

An enemy attempting to detect and destroy an aircraft, tank, or ship may transmit an optical signal using a laser or other suitable transmitting device and look for a return signal much like with a radar. To prevent the enemy from receiving an accurate optical return signal, a jamming signal of the same wavelength may be transmitted back. To effectively transmit back a return signal, however, one must quickly and accurately determine the wavelength of the incoming signal transmitted by the enemy.

In the past, determination of the wavelengths of incoming signals, or spectral discrimination, has been performed by using a large number of narrow band filters. A large number of narrowband filters, however, are required so that the wavelength range covered by the narrowband filters can cover the possible wavelength range of every enemy transmitter. In other words, the bandpass region of an individual filter has had to be small so that an incoming signal of a given wavelength can be identified with the wavelength range of a single filter.

To achieve higher resolution, or to detect enemy signals with increasingly narrower wavelength ranges, an even larger number of narrow band (laser line) filters has been required. Wavelength resolution, therefore, has been controlled by the number of filters, and the narrowness of the filter band pass regions.

SUMMARY OF THE INVENTION

The present invention obtains a high resolution of wavelength without incorporating a narrow band filter for each wavelength to be detected. In other words, wavelength can accurately be resolved using a limited number of broadband filters.

The present invention also allows wavelength detection without knowing the particular wavelength range of possible enemy signals for purposes of obtaining narrow band filters with the correct bandpass region. If the enemy shifts the frequency of his source signal slightly, presence of the signal may still be detected with the same resolution without the worry of the source shifting out of the narrow bandpass regions of a group of filters.

The present invention provides for the conversion of wavelength measurement into time measurement. In doing so, the invention takes advantage of the fact that the technology required to measure small time intervals is very well developed compared to the technology required to measure small wavelength intervals. With more precise measurement techniques available for time measurements, the mapping of wavelength into time domain enables wavelength determination with higher resolution.

The present invention accomplishes these above listed features in a general aspect by using a system of broadband filters in conjunction with optical delay lines.

The invention more particularly operates by capturing an incident optical pulse with an array of apertures which are connected to a plurality of broadband filters. The broadband filters have overlapping band pass regions to cover the wavelength spectrum of potential threats, but not with the resolution of a large number of narrowband filters. To enable the broadband filters to attain increased resolution without adding additional filters, each broadband filter is connected by an optical delay line to a first photodetector. The amount of time delay created by an optical delay line depends upon the length of fiber making up the delay line and the wavelength of the signal on the fiber. The fiber length for each delay line is different to create a unique delay for each filter so that signals arriving from separate filters may be readily distinguished.

To enable measurement of the time delay, a second set of separate optical lines with no relative delay is connected directly from the array of apertures to a second photodetector. The time difference between when a signal arrives over optical delay lines from the filters and when a signal arrives over optical lines directly from the array of apertures may now be reconverted mathematically into wavelength.

To measure time delay and reconvert time into wavelength, the photodetectors, upon receiving an optical signal, generate an electrical signal which triggers an RLC circuit to produce a rapidly decaying sinusoidal signal. The sinusoidal signal of the RLC circuit is fed to a zero crossing detector which produces a signal to trigger a counter. The counter starts when a signal is received from the optical lines with no delay and the counter stops when a signal is received from the broadband filters through optical lines with a delay. The time measured by the counter is reconverted into wavelength by an interpolation scheme of a microprocessor. The interpolation scheme uses the time delay and transmission curves for each filter to determine wavelength to a high degree of resolution.

BRIEF DESCRIPTION OF THE DRAWINGS

Further details of the present invention are explained with the help of the attached drawings in which:

FIG. i is a schematic illustration of the present invention; and

FIG. 2 is a graph of wavelength vs. percent transmission for a series of broadband filters with overlapping bandpass regions.

DESCRIPTION OF THE PREFERRED EMBODIMENTS

FIG. 1 is a schematic illustration of the present invention which begins with an array of apertures 1-16 capable of capturing incident optical pulses with a broad range of wavelengths to detect potential threats. Optical fibers run from each aperture 1-16 to each of four broadband filters 21-24.

The broadband filters 21-24 cover separate wavelength ranges, but have overlapping band pass regions to cover the wavelength spectrum of potential threats captured by the array of apertures. The broadband filters 21-24 determine a range of wavelengths in which the incoming signal occurs, but not with the resolution of a large number of narrowband filters.

To increase resolution of the broad band filters without adding additional filters, each broadband filter 21-24 sends an output signal over its respective optical delay line 31-34. The delay for each optical delay line 31-34 is unique for each filter. The delay associated with each filter depends on the length of additional optical fiber added to the optical delay line for that filter beyond a standard length. In this manner, wavelength is mapped into a time delay, enabling further wavelength resolution beyond the range of broadband filters 21-24.

To measure the delays caused by the optical delay lines 31-34, and thus determine wavelength more precisely, a second set of optical lines 41-56 is run directly from the array of apertures 1-16 to a photodetector 60. Each of the optical lines 41-56 is made of fibers of the standard length. No additional delay is added to these lines. The time difference between when a signal arrives over an optical delay line 41-56 and when the signal arrives over an optical line 31-34 can now be reconverted mathematically into wavelength.

To enable the mathematical reconversion of time into wavelength, the optical lines 41-56 are connected to the first photo detector 60, referred to as the start photo detector. A second photo detector 65, referred to as the stop photo detector, is connected to optical delay lines 31-34. An optical signal received by the start photo detector 60 and the stop photo detector 65 is converted to an electrical signal and fed to a parallel resistance, inductance and capacitance (RLC) circuit 70. The parallel RLC circuit 70 produces a decaying sinusoidal signal similar to the signal of an overdamped oscillator. The sinusoidal signal of the parallel RLC circuit 70 is then fed to a zero crossing detector 75 which produces a signal to trigger counter 80. The difference in time counted by counter 80 between when an optical signal is detected by the start photo detector 60 and the time when the optical signal is detected by the stop photo detector 65 is the time measurement which is converted into wavelength.

Thus, operation of the invention may be described as follows. An incident light pulse strikes the array of apertures 1-16 and is fed through optical fibers 41-56 to the start photo detector 60. Start photo detector 60 generates an impulse of current causing the parallel RLC circuit 70 to ring cyclically with a sinusoidal voltage which rapidly decays. The second zero crossing of this decaying sinusoidal voltage is used to start counter 80. The incident light pulse is also fed through broadband filters 21-24 and delay lines 31-34 to stop photo detector 65. Stop photo detector 65 generates another impulse of current causing the parallel RLC circuit 70 to generate a second sinusoidal voltage. The second zero crossing of this sinusoidal voltage stops the counter 80.

An interpolation scheme may now be used by the microprocessor/interpolator 85 to convert the length of time measured by counter 80 into wavelength. The interpolation scheme for wavelength uses the time delay to identify the filter, and also uses the time delay to further resolve the wavelength within the range of wavelengths received by the identified filter.

The microprocessor/interpolator 85 also makes wavelength calculations using the transmission curve for the filters. FIG. 2 shows typical transmission curves for a series of 7 broadband filters 1-7 having overlapping band pass regions. The graph plots wavelength ($\lambda$) vs. percent transmission (% T) for a series of broadband filters 1-7. The overlapping bandpass regions are capable of detecting an incident optical signal with a wavelength typically between about 360 and 800 nm. For instance, filter 1, depicted by the solid line, may have a bandpass region from approximately 360-460 nm and overlaps filter 2, depicted by the dashed line, which may have a bandpass region from 420-500 nm.

For a composite pulse, or a pulse composed of a broad spectrum of wavelengths, the microprocessor/interpolator 85 performs a weighted average of the time delays of light pulses traveling through the various filters to determine an average time delay. Consider a series of filters with transmission characteristics similar to those shown in FIG. 2. Because of the overlapping of the filter transmission, light of a given range of wavelengths may be transmitted through more than one filter. The transmission is different for each filter, depending upon specific transmission characteristics of the filters. The computer/interpolator 85 calculates the weighted average time delay for a composite pulse using the following formula:

$$t_{average} = \frac{\Sigma t_i * T_i}{\Sigma T_i}$$

where
$t_I$ = the time delay associated with each filter at an incremental wavelength of interest; and
$T_I$ = the percent transmission in the corresponding filters at the incremental wavelength of interest.

To construct this invention, the shape of the transmission curves of individual filters is irrelevant. The curves do not necessarily have to match for each filter, although the interpolation scheme becomes simple if all filters have identical transmission characteristics relative to the center frequency of the filters. Likewise, the transmission bandwidths for the various filters are not required to be the same for the interpolation system to work. In fact, if one knows the spectral region of an enemy threat signal, then the interpolation may be enhanced by using more filters with smaller bandpass regions.

Although the invention has been described above with particularity, this was merely to teach one of ordinary skill in the art how to make and use the invention. Many modifications will fall within the scope of the invention, as that scope is defined by the following claims.

For instance, optical fibers may be replaced by other means for transmitting light pulses such as through air using a system of lenses and mirrors, or through optically transmitting material embedded in a substrate. The start and stop photo detectors may be replaced by a single photodetector 66, or time may be measured using optical devices rather than converting to an electrical signal using the photodetectors. The array of apertures may be replaced by a single receiving aperture, or other means for carrying an optical signal. Rather than providing optical fibers with a uniform delay by connecting them on one end to the array of apertures (shown as optical fibers 41-56), the optical fibers with a uniform delay may instead be connected to the filters 21-24 (shown as optical fibers 91-94 in FIG. 1) and still perform a similar function.

What is claimed is:
1. An apparatus for determining the wavelength spectrum of an incident optical signal comprising:
   a plurality of filters adapted to receive the incident optical signal and to separate the incident optical signal into separate bandwidth components;

means for producing a time delay in an optical signal passed by each filter in the plurality of filters in response to the incident optical signal, the time delay dependent upon wavelength of the incident optical signal;

means for measuring the time delay; and means for converting the time delay measurement into a wavelength measurement.

2. An apparatus as claimed in claim 1 wherein the means for producing a time delay comprises:

a plurality of optical delay lines, an optical delay line in the plurality of optical delay lines connected to each filter in the plurality of filters.

3. An apparatus as claimed in claim 2 wherein the plurality of optical delay lines have incrementally increasing lengths.

4. An apparatus as claimed in claim 3 wherein the means for measuring the time delay comprises:

a separate optical line adapted to receive the incident optical signal which is a different length than any of the plurality of optical delay lines; and means for measuring a time difference between when an optical signal is passed by the plurality of optical delay lines and when the incident optical signal is passed by the separate optical line.

5. An apparatus as claimed in claim 3 wherein the means for measuring the time delay comprises:

a separate optical line adapted to receive the optical signal passed by at least one of the filters in the plurality of filters, said separate optical line having a different length than any of the plurality of optical delay lines; and means for measuring a time difference between when an optical signal is passed by the plurality of optical delay lines and when a signal is passed by the separate optical line.

6. An apparatus as claimed in claim 4 wherein the means for measuring the time delay further comprises:

a photodetector which produces a first electrical pulse upon receipt of the optical signal passed by any of the plurality of optical delay lines and which produces a second electrical pulse upon receipt of the incident optical signal passed by the separate optical line; and means for producing a time delay signal representative of a time between when the photodetector produces the first electrical pulse and when the photodetector produces the second electrical pulse.

7. An apparatus as claimed in claim 6 wherein the means for producing a time delay signal comprises:

an oscillator operable to produce a decaying oscillating signal upon receipt of the first electrical pulse or the second electrical pulse from the photodetector;

a zero crossing detector operable to generate a pulse upon receiving the decaying oscillating signal; and a counter triggered to start upon receiving a first such pulse from the zero crossing detector and triggered to stop upon receiving a second such pulse from the zero crossing detector.

8. An apparatus as claimed in claim 7 wherein the oscillator comprises a parallel RLC circuit.

9. An apparatus as claimed in claim 4 wherein the means for measuring the time delay further comprises:

a first photodetector adapted to receive the incident optical signal from the separate optical line and to generate a first electrical pulse upon such receipt;

a second photodetector adapted to receive the optical signal passed by any of the plurality of optical delay lines and to generate a second electrical pulse upon such receipt; and means for producing a time delay signal representative of a time between when the first photodetector produces the first electrical pulse and when the second photodetector produces the second electrical pulse.

10. An apparatus as claimed in claim 9 wherein the means for producing an electrical signal comprises:

an oscillator operable to produce a decaying oscillating signal upon receipt of the first electrical pulse or the second electrical pulse;

a zero crossing detector operable to generate a pulse upon receiving the decaying oscillating signal; and a counter triggered to start upon receiving a first such pulse from the zero crossing detector and triggered to stop upon receiving a second such pulse from the zero crossing detector.

11. An apparatus as claimed in claim 10 wherein the oscillator comprises a parallel RLC circuit.

12. An apparatus as claimed in claim 6 wherein the means for converting the time delay into a wavelength measurement comprises:

a processor which converts the time delay signal into a wavelength measurement using an interpolation scheme.

13. An apparatus as claimed in claim 12 wherein the interpolation scheme calculates a weighted average time delay for a composite pulse using a formula:

$$t_{average} = \frac{\Sigma t_i * T_i}{\Sigma T_i}$$

where $t_{average}$ = the weighted average time delay $t_I$ = the time delay at an incremental wavelength of interest for a delay line in the plurality of delay lines attached to a particular filter in the plurality of filters; and $T_I$ = a percent transmission for the particular filter at the incremental wavelength of interest.

14. An apparatus as claimed in claim 1 wherein the plurality of filters have overlapping bandpass regions.

15. An apparatus as claimed in claim 1 further comprising an array of apertures adapted to capture the incident optical signal and feed the incident optical signal to the plurality of filters.

16. An apparatus for determining the wavelength spectrum of an incident optical signal comprising:

an array of apertures which capture the incident optical signal;

a plurality of filters, each filter in the plurality of filters connected by an optical fiber to each aperture in the array of apertures, said plurality of filters having overlapping band pass regions;

a plurality of optical delay lines, an optical delay line in the plurality of optical delay lines connected to a respective filter in the plurality of filters, the optical delay line imposing a time delay on light received from its respective filter dependent on wavelength, each optical delay line in the plurality of optical delay lines having an incrementally increasing fiber length to add an additional time delay to distinguish each filter in the plurality of filters;

a plurality of separate optical lines, each separate optical line in the plurality of separate optical lines connected to an aperture in the array of apertures and each separate optical line in the plurality of separate optical lines having a uniform filter length different from the length of the plurality of optical delay lines;

a first photo detector connected to the plurality of separate optical lines, said first photo detector generating a first electrical pulse upon receipt of the incident optical signal from any of the plurality of separate optical delay lines;

a second photo detector connected to the plurality of optical delay lines, said second photo detector generating a second electrical pulse upon receipt of the optical signal from any of the plurality of optical delay lines;

a parallel RLC circuit connected to the first photo detector and the second photo detector, said RLC circuit producing a first decaying sinusoidal signal upon receiving the first electrical pulse and a second decaying sinusoidal signal upon receiving the second electrical pulse;

a zero crossing detector connected to the RLC circuit, the zero crossing detector generating a first zero crossing signal upon receiving the first decaying sinusoidal signal and generating a second zero crossing signal upon receiving the second decaying sinusoidal signal;

a counter connected to the zero crossing detector, said counter generating a time delay count signal, said time delay count signal starting upon receiving the first zero crossing signal and stopping upon receiving the second zero crossing signal; and a microprocessor connected to said counter, the microprocessor programmed to convert the time delay count signal into a wavelength measurement.

17. A method for determining a wavelength spectrum of an incident optical signal comprising:

receiving the incident optical signal;

filtering the incident optical signal into separate wavelength bandwidth optical signals;

imposing a time delay in the separate wavelength bandwidth optical signals, the time delay dependent upon wavelength of the separate wavelength bandwidth optical signals;

measuring the time delay; and converting the time delay measurement into a wavelength measurement.

18. An apparatus for distinguishing incident light transmitted by a particular enemy transmitter in a group of enemy transmitters which transmit a spectrum of wavelength ranges, each enemy transmitter transmitting a distinguishable wavelength range in a spectrum of wavelength ranges, said apparatus comprising:

a set of optical bandpass filters substantially fewer in number than the group of enemy transmitters, the set of optical bandpass filters receiving the incident light and separating the incident light into separate wavelength components spanning the spectrum of wavelength ranges of the group of enemy transmitters;

means for generating a separate optical time delay for each optical band pass filter, said time delay distinguishing individual filters in the set of optical band pass filters and said time delay dependent on wavelength of light received from each bandpass filter in the set of optical band pass filters; and means for converting said time delay into a wavelength measurement, said wavelength measurement separating the distinguishable wavelength ranges enabling determination of which enemy transmitter in the group of enemy transmitters transmitted the incident light.

* * * * *

UNITED STATES PATENT AND TRADEMARK OFFICE
CERTIFICATE OF CORRECTION

PATENT NO. : 5,225,894
DATED : July 6, 1993
INVENTOR(S) : James E. Nicholson, Jack H. Parker, Jagdish P. Mathur and David M. Hull It is certified that error appears in the above-indentified patent and that said Letters Patent is hereby corrected as shown below:

In column 4, line 25, change "$t_I$" to --$t_i$--.

In column 4, line 27, change "$T_I$" to --$T_i$--.

In claim 13, column 6, line 39, change "$t_I$" to --$t_i$--.

In claim 13, column 6, line 43, change "$T_I$" to --$T_i$--.

Signed and Sealed this

First Day of March, 1994

Attest:

BRUCE LEHMAN

Attesting Officer        Commissioner of Patents and Trademarks